INVENTOR
PAUL B. FLAGG
BY Thomas & Thomas
ATTORNEYS

United States Patent Office 3,466,471
Patented Sept. 9, 1969

3,466,471

CIRCUIT FOR SENSING BINARY SIGNALS FROM A HIGH SPEED MEMORY DEVICE

Paul B. Flagg, Broome, N.Y., assignor to International Business Machines Corporation, Armonk, N.Y., a corporation of New York Filed Dec. 30, 1965, Ser. No. 517,723
Int. Cl. H03k 3/26, 19/08, 23/14
U.S. Cl. 307—322 7 Claims

ABSTRACT OF THE DISCLOSURE

A high speed sensing circuit includes a difference amplifier with first and second output circuits; the first output circuit is connected to a tunnel detector and operates the detector when a signal representing a binary one is presented; the second output circuit is connected through a transistor switch to the detector, and the switch is operated to disable the detector when a signal representing a binary zero is presented.

Background of the invention (1) This invention relates to circuits for use with a high speed memory device and more particularly to such circuits which reliably distinguish between binary one and zero signals read at high speed from a memory device.

(2) In many types of memory devices, particularly non-destructive readout memory devices, interrogation is performed at high speed, and binary information is represented by a positive signal swing followed by a negative signal swing to represent a binary one and a negative swing followed by a positive signal swing to represent a binary zero. The primary signal is the positive swing for a binary one and the negative swing for a binary zero. The primary signal in each instance represents the binary quantity stored. The negative signal swing for a binary one and the positive signal swing for a binary zero are referred to as the flyback, and these signals are undesirable signals which inherently are present. If the primary signals could be isolated during a reading operation, area integration of the signals would provide discrimination by leaving a net positive area for a binary one and a net negative area for a binary zero. It is difficult, however, in practice to provide an integrator having sufficient accuracy to strobe the start and stop time of integration at the speeds involved. The time period between the peak positive swing of a binary one and the peak positive swing of a binary zero is approximately 20 nanoseconds. If accurate time strobing could be reliably accomplished, discrimination between one end zero signals could be performed by a time strobe. An alternative approach is the use of the stored charged characteristic or a forward biased diode to absorb the flyback signal, but this approach requires extremely well controlled diode thresholds and amplifier gains which are not feasible at these speeds.

In some cases the minimum and maximum amplitudes of the binary signals are not relatively widely separated in time, at the speeds involved, and the ratio of the peak amplitude of the primary signal to the peak amplitude of the flyback signal may be in the order of 2 to 1, and it is very possible that the positive flyback signal from a binary zero may exceed in amplitude the minimum positive peak of the primary signal of a binary one in some cases. Thus it is seen that the problem of reliably sensing binary information signals involves amplitude discrimination as well as precise timing.

Summary of the invention

It is a feature of this invention to overcome the foregoing difficulties by providing an improved circuit arrangement for reliably sensing binary ones and zeros from a high speed memory device by using the primary signal to operate a switch which performs the rejection of the unwanted flyback signal.

It is a feature of this invention to provide an improved circuit arrangement for sensing binary information signals at high speeds by permitting the primary signal of a binary one to operate a detector and permitting the primary signal of a binary zero to operate a switch which disables the detector whereby reliable discrimination may be accomplished at high speeds.

It is a feature of this invention to provide an improved sensing circuit for use with high speed memory devices which reliably distinguishes between binary one signals and binary zero signals which have undesirable flyback signals.

In one arrangement according to this invention the binary signals are supplied to a difference amplifier which has two output lines, the first of which provides an amplified version of the input signal and the second of which provides an inverted, amplified version of the input signal. The signal on the first output line is supplied to a detector, and the signal on the second output line is connected as an input to a voltage switch. The voltage switch has an output coupled through a condenser to a second input of the detector. A strobe current is applied to the second input of the detector. When binary zero signals are applied to the input of the difference amplifier, the signal on the second output line is a positive signal which fires the voltage switch, and the voltage change at its output causes a current $I_c$ which biases the detector in the off direction and prevents the detector from providing an output signal, thereby signifying a binary zero is read. If a binary one signal is supplied to the input of the difference amplifier, the signal one the first output line will reach a positive peak; this signal in conjunction with the strobe pulse operates the detector to provide an output signal; the voltage switch is operated at a later point in this cycle when the signal on the second output line swings positively enough to fire the voltage switch, at which time the detector is turned off. The resulting output signal from the detector signifies that a binary one is read.

The foregoing and other objects, features and advantages of the invention will be apparent from the following more particular description of a preferred embodiment of the invention, as illustrated in the accompanying drawings.

Brief description of the drawings

FIGURE 1 illustrates in block form one preferred arrangement according to this invention.

FIGURE 4 illustrates the worst case of binary one and zero signal amplitudes which a detector must distinguish between.

Description of the preferred embodiment

Figures 1, 4:
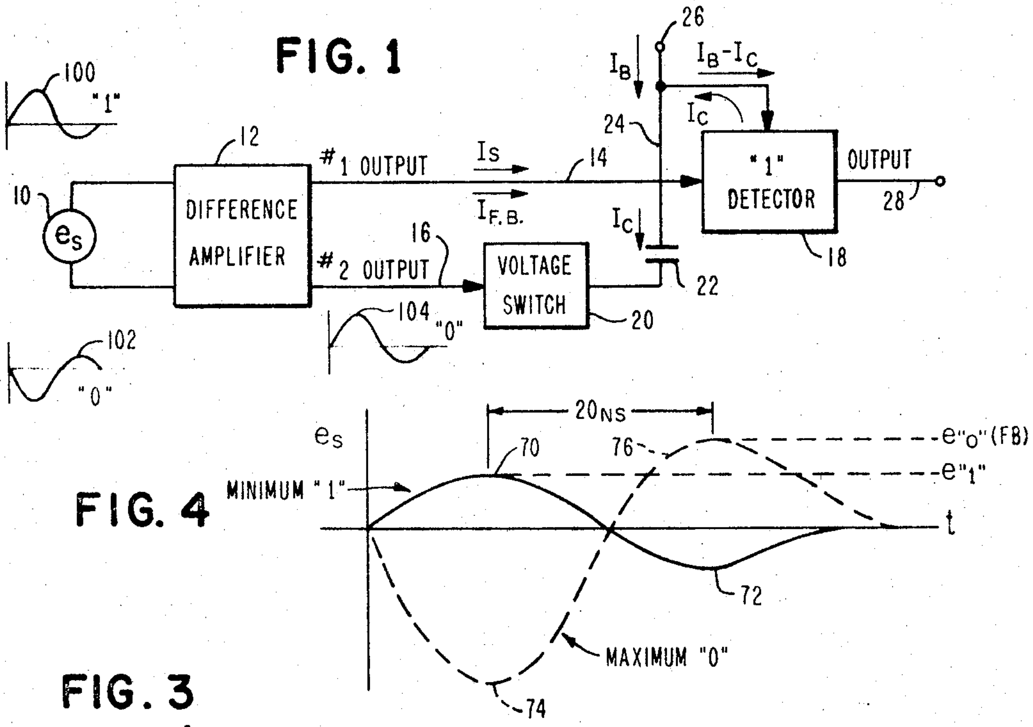

Reference is made to FIGURE 1 for a description of a preferred system arrangement according to this invention. A signal source 10, which may be a memory device, is coupled to a difference amplifier 12 which provides a first output on a line 14 and a second output on a line 16. The first output on the line 14 is supplied to a detector 18, and the second output on the line 16 is supplied to a voltage switch 20. The voltage switch 20 has an output which is coupled through a condenser 22 along a line 24 to the detector 18. A strobe current is applied through a terminal 26 to the detector 18. The detector 18 provides an output signal on a line 28 which may be further amplified by a buffer amplifier not shown in FIGURE 1.

Figure 2:
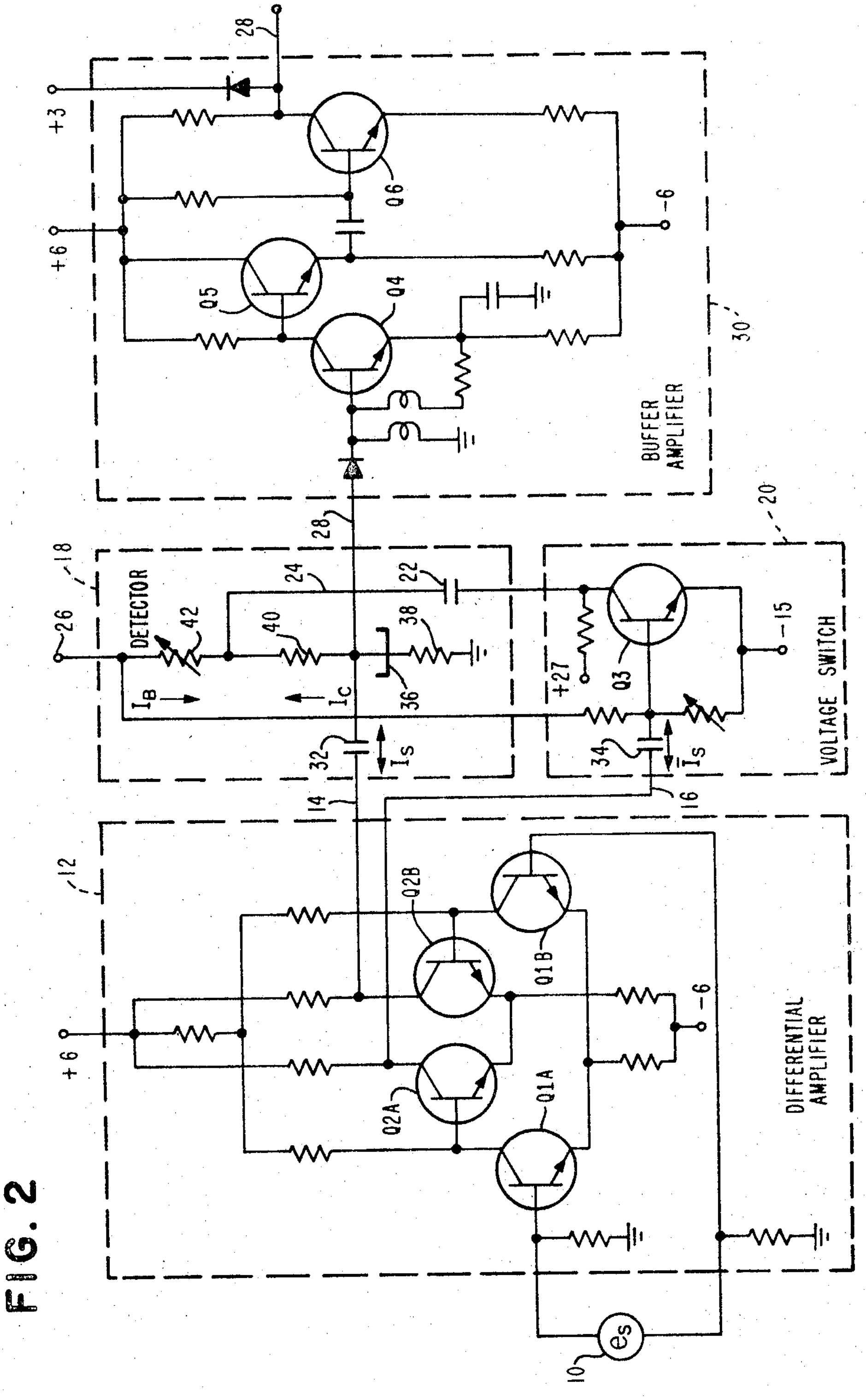
FIGURE 2 illustrates in detail one circuit arrangement which might be employed for the block diagram illustrated in FIGURE 1.

Reference is made to FIGURE 2 which illustrates in detail one circuit arrangement which may be employed in the system illustrated in FIGURE 1. The difference amplifier 12 is illustrated with two stages of amplification. The first stage of amplification includes transistors Q1A and Q1B, and the second stage of amplification includes transistors Q2A and Q2B. The outputs from the difference amplifier on lines 14 and 16 are taken from respective transistors Q2B and Q2A as shown. The output signal on the line 14 passes through a coupling condenser 32 to the detector 18, and the output signal on the line 16 passes through a coupling condenser 34 to the voltage switch 20.

The detector 18 includes a tunnel diode 36 connected in series with resistors 38, 40 and 42 as shown. The voltage switch 20 includes a transistor switch Q3 connected in a circuit arrangement as shown. The output of the detector 18 is coupled to a buffer amplifier 30 which includes transistors Q4. Q5 and Q6 connected in the circuit arrangement as illustrated.

Figure 3:
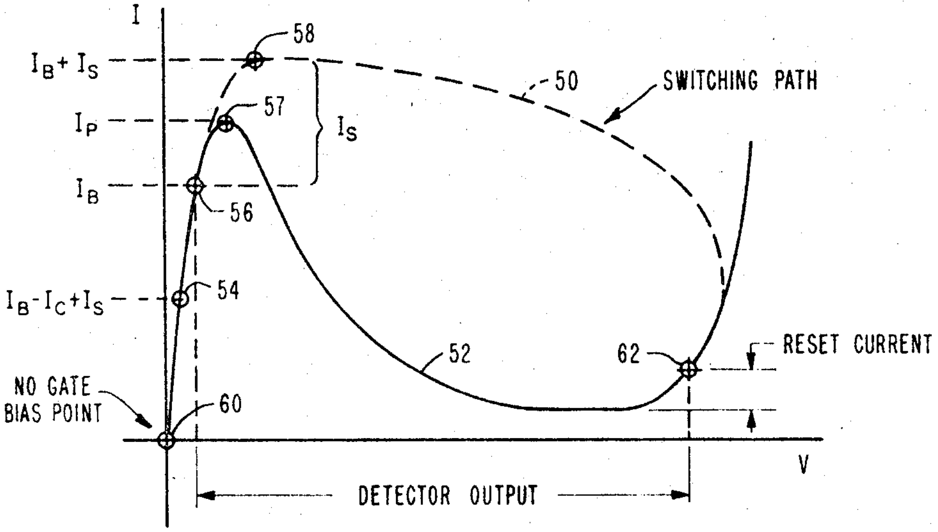
FIGURE 3 illustrates the characteristic curve for a tunnel diode.

Reference is made next to FIGURE 3 which illustrates the characteristic curve of the tunnel diode 36 in FIGURE 2. The dotted line curve 50 in FIGURE 3 illustrates the switching path of the tunnel diode when it is turned on, and the solid line 52 indicates the switching path for minimum input current. The point 54 represents the bias on the tunnel diode when a positive flyback signal is received during the period when a binary zero is read. The point 56 represents the bias level applied to the tunnel diode by a strobe current pulse $I_B$, and the distance between points 57 and 58 represents the range of bias condition of the tunnel diode when a binary one is read. The point 60 represents the bias point of the tunnel diode when no gate or strobe signal is applied. The point 62 represents the operating point of the tunnel diode on the characteristic curve 52 when reset commences.

The signal source 10, represented in block form in FIGURES 1 and 2, is a memory device which stores binary ones and zeros. In many types of memory devices, particularly non-destructive read-out memory devices, a characteristic flyback signal is present during reading operations. FIGURE 4 illustrates this with respect to the reading of binary ones and zeros. When a binary one is read, it produces an output signal having a positive swing illustrated by the wave form 70 in FIGURE 4 followed by a negative swing depicted by the wave form 72. The curves 70 and 72 depict the minimum amplitude which may be detected when reading a binary one. When a binary zero is read, it produces an output signal which has a negative swing depicted by the dotted line wave form 74 followed by a positive swing depicted by the dotted line wave form 76. The positive wave form 70 and the negative wave form 74 are primary signals which represent the respective binary one and binary zero quantities stored. The wave form 72 depicts the flyback signal when reading a binary one, and the wave form 76 depicts the flyback signal when reading a binary zero. The difference in time between the peak amplitude of the primary wave form 70 of a binary one and the peak amplitude of the flyback wave form 76 of a binary zero is in the order of twenty nanoseconds. The time difference of twenty nanoseconds between the two peaks makes time strobing to discriminate between binary one and binary zero during a reading operation an impractical, if not an impossible task. Amplitude discrimination is impractical since, as illustrated in FIGURE 4, the minimum positive swing 70 of a binary one may in some cases be less than the positive flyback swing of a binary zero. According to the techniques of this invention, however, binary ones and zeros may be reliably distinguished in high speed memory devices. The manner in which reliable reading of binary ones and zeros in high speed memory devices, particularly non-destructive read-out memory devices, may be accomplished is explained next.

Referring first to FIGURE 1, the basic features of this invention are explained. Let it be assumed for purposes of illustration that a binary one is read. When a binary one is read, it presents a signal depicted by the wave form 100 in FIGURE 1 to the difference amplifier. An amplifier version of this wave form appears on the first output line 14, and an amplified, inverted version of this wave form appears on the second output line 16. A strobe current $I_B$ is applied to the terminal 26 prior to a reading operation, and it persists until the reading operation is completed. A signal current $I_s$ on the first output line 14 is applied to the detector 18, and this is a positive signal as indicated by the positive portion of the wave form 100 in FIGURE 1. During this same period of time a negative current is applied on the second output line 16 to the voltage switch 20 in FIGURE 1, and this current is indicated by the negative portion of the wave form 102 in FIGURE 1. This negative current maintains the voltage switch 20 in the off condition, and no current $I_c$ flows through the condenser 22 to the detector 18. Consequently, the positive bias current $I_B$ is applied to the detector 18 in FIGURE 1 simultaneously with the positive signal current $I_s$. The currents $I_B$ and $I_s$ are sufficient to operate the detector 18 since they bias the tunnel diode 36 in FIGURE 2 at or between the points 57 and 58 in FIGURE 3 which is sufficient to cause conduction in this diode and provide a positive output signal on the line 28 in FIGURE 1. As soon as the current $I_s$ on the line 14 in FIGURE 1 swings negatively as indicated by the negative portion of the wave form 100 in FIGURE 1, the detector 18 is reset, thereby terminating the output signal. Accordingly, it is seen that a positive output pulse is provided on the output line 28 indicating that a binary one was read.

Let it be assumed next for purposes of illustration that a binary zero is read. Whenever a binary zero is read, the signal source 10 in FIGURE 1 provides an output signal such as indicated by the wave form 102 in FIGURE 1. This signal is applied to the difference amplifier 12, and it provides an output signal on the first output line 14 which is an amplified version of the wave form 102 in FIGURE 1. The difference amplifier 12 also provides an output signal on the second output line 16 which is an amplified, inverted version of the output signal on the line 14. This inverted version of the signal on the line 16 is indicated by the curve 104 in FIGURE 1. The first half cycle of this inverted signal is positive, and it operates the voltage switch 20 which causes a positive output current $I_c$ to flow through the condenser 22. The signal current $I_s$ on the line 14 is negative during the first half cycle of the wave form of a binary zero. The currents $I_c$ and $I_s$ oppose the bias current $I_B$, and the net resultant current prevents the detector 18 from conducting. The operating point for this condition is below the point 56 in FIGURE 3. The voltage switch 20 in FIGURE 1 is a transistor Q3 as illustrated in FIGURE 2, and this transistor is an avalanche transistor the collector voltage of which is allowed to change through the negative half cycle of the signal 104 in FIGURE 1. This changing voltage supports the flow of current $I_c$. Thus the current $I_c$ through the condenser 22 continues to oppose the bias current $I_B$ and maintain the detector 18 below the operating point 56 in FIGURE 3. The zero flyback portion of the signal on the output line 14 in FIGURE 1 is a positive current such as indicated by the positive portion of the wave form 102 in FIGURE 2. This current moves the operating point of the detector 18 upward to a point which is below the point 56 in FIGURE 3. Consequently, the detector 18 does not conduct, and no output signal is applied to the output line 28 during the zero flyback portion of a read operation. Thus it is seen that no output signal is applied on the output line 28 during the application of a strobe current pulse $I_B$, and the absence of an output signal on the line 28 represents a binary zero.

Figure 5:
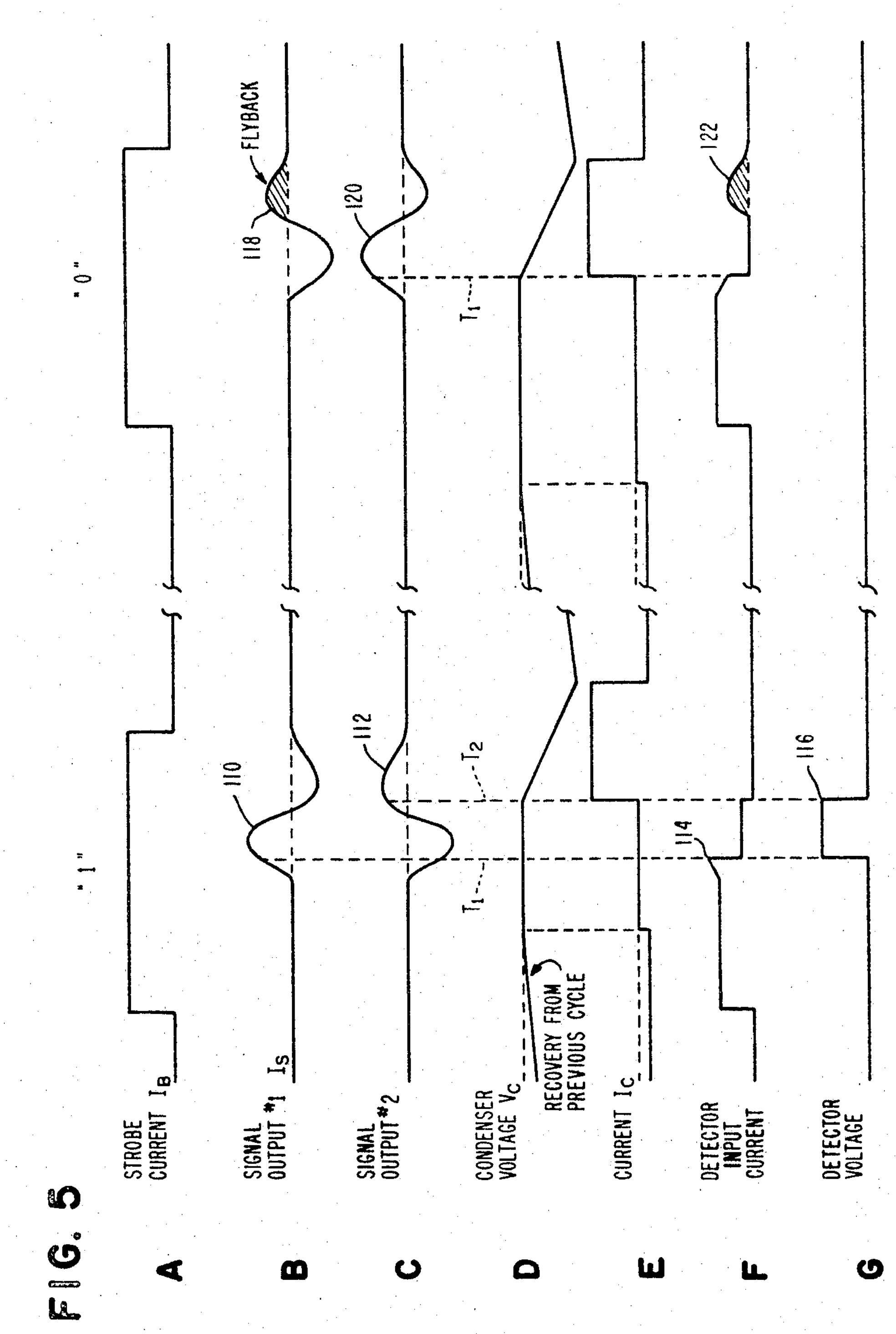
FIGURE 5 illustrates wave forms of signals which occur at different places in the circuit of FIGURE 2, and these wave forms are useful in explaining the operation of the circuit in FIGURE 2.

The foregoing operation is explained in greater detail with reference to the circuit arrangement illustrated in FIGURE 2. The wave forms in FIGURE 5 indicate the signal changes which occur at different places in FIGURE 2 when binary ones and zeros are read. It is noted that FIGURE 5 illustrates in the left half portion the signal levels which take place whenever a binary one is read, and it indicates in the right half portion the signal levels which take place when a binary zero is read. Referring next to FIGURE 2, a strobe current pulse is applied to the terminal 26 of the detector 18 prior to commencing a reading operation, and this strobe pulse is indicated in FIGURE 5A. A signal source 10, representing a memory device, in FIGURE 2 supplies a signal to the differential amplifier 12 whenever a stored binary quantity is read. It is assumed for purposes of illustration that a read operation for a binary one takes place. The resulting signal generated by the signal source 10 in FIGURE 2 is indicated by the wave form 110 in FIGURE 5B. This signal is amplified and appears on the first output line 14 in FIGURE 2. The inverse of the signal on the output line 14 appears on the second output line 16 in FIGURE 2, and this signal is illustrated in FIGURE 5C by the wave form 112. The positive portion of the wave form 110 in FIGURE 5B supplies a positive current $I_s$ to the detector 18, and this current in combination with the positive strobe current $I_B$, initiates conduction of the tunnel diode 36 of the detector 18 at time $t_1$ in FIGURE 5. The input current to the detector 18 at time $t_1$ is indicated in FIGURE 5F at point 114. This current includes the bias current $I_B$, the signal current $I_s$ and no current from the condenser 22 in FIGURE 2. No current flows through the condenser 22 at this time because the voltage switch 20 is maintained in the off condition by the negative signal swing of the wave form 112 shown in FIGURE 5C. The sum of the currents $I_B+I_s$ is sufficient to fire the tunnel diode 36 of the detector 18 at the time $t_1$, and the magnitude of the current at the point 114 in FIGURE 5F lies at or somewhere between the points 57 and 58 in FIGURE 3. As soon as the tunnel diode 36 fires, an output signal is developed across the resistor 38 of the detector 18, and this output signal is applied on the line 28 to the buffer amplifier 30. The output signal is depicted in FIGURE 5G as a voltage pulse which rises at time $t_1$ and terminates at time $t_2$ whenever a binary one is read. At time $t_2$ the current $I_s$ on the line 14 in FIGURE 2 swings negatively as indicated by the wave form 110 in FIGURE 5B, and the positive going portion of the signal 112 in FIGURE 5C causes the transistor Q3 of the voltage switch 20 to conduct, thereby supplying a current $I_c$ through the condenser 22 to the detector 18 as indicated in FIGURE 5E. However, the detector 18 in FIGURE 2 terminates conduction at the time $t_2$ in FIGURE 5 because resultant net current of the negative signal current $I_s$, the current $I_c$, which opposes the bias current $I_B$ is sufficiently low to cause resetting of the tunnel diode 36 of the detector 18. As a result the detector output voltage is a positive pulse such as indicated at 116 in FIGURE 5G. The voltage across the condenser 22 is indicated by the voltage wave form $V_c$ in FIGURE 5D, and the current through the condenser 32 is indicated by the current wave form $I_c$ in FIGURE 5E. At time $t_2$ in FIGURE 5 a positive going signal shown at 112 in FIGURE 5C is applied on the second output line 16 in FIGURE 2 to the voltage switch 20. This signal is coupled from the line 16 in FIGURE 2 through the condenser 34 to the base of the transistor Q3. This causes the transistor Q3 to conduct and switch the condenser 22 from a positive signal level to a negative signal level as shown in FIGURE 2. The resulting change in voltage across the condenser 22 is illustrated in FIGURE 5D, and the current $I_c$ through the condenser 22 in FIGURE 2 is illustrated in FIGURE 5E as increasing rapidly at time $t_2$. The positive strobe current $I_B$, the condenser which opposes the strobe current $I_B$, and the positive signal current $I_s$ at time $t_2$ provide a resultant current which causes the tunnel diode 36 in FIGURE 2 to be operated at a point below its reset level shown at point 60 in FIGURE 3. Thus it is seen that the output signal from the detector 18 in FIGURE 2 is a positive voltage pulse such as indicated at 116 in FIGURE 5G whenever a binary one is read.

Let it be assumed for purposes of illustration that a binary zero is read from the memory device 10 in FIGURE 2. The changes in the wave forms at various points in the circuit of FIGURE 2 are illustrated in the right half portion of FIGURE 5 for this case. In this instance the output signal on the first output line 14 in FIGURE 2 is a negative current $I_S$ at time $t_1$ of the read cycle. This negative signal on the output line 14 is shown by the negative portion of the wave form 118 in FIGURE 5B. There is a positive signal on the second output line 16 in FIGURE 2 at time $t_1$ as indicated by the wave form 120 in FIGURE 5C, and this positive signal fires the transistor Q3 of the voltage switch 20 at time $t_1$, thereby supplying a current $I_c$ through the condenser 22 to the tunnel diode 16 of the detector 18 in FIGURE 2. The strobe current $I_R$ is opposed by the condenser current $I_c$ and the signal current $I_s$, and the resultant current prevents the tunnel diode 36 from firing at time $t_1$. Consequently, there is no output voltage pulse initiated at time $t_1$ whenever a binary zero is read. A positive flyback signal is established on the line 14 whenever a binary zero is read, and this positive signal is illustrated by the cross-hatched portion of the wave form 118 in FIGURE 5B. This positive flyback signal causes the detector input current to increase as illustrated at 122 in FIGURE 5F, but the net result of the strobe current $I_B$, the flyback current $I_s$ and the condenser current $I_c$ is not sufficient to fire the tunnel diode 36. The tunnel diode is biased at the point 54 in FIGURE 3. Consequently, it is seen that no output voltage pulse is established on the line 28 from the detector 18 in FIGURE 2 whenever a binary zero is read.

Thus it is seen that a novel circuit arrangement is provided whereby the detector is disabled during the positive flyback portion of a binary zero signal read from a memory device. This unique and novel circuit arrangement permits reliable reading of binary ones and zeros from a very high speed memory device.

While the invention has been particularly shown and described with reference to a preferred embodiment thereof, it will be understood by those skilled in the art that various changes in form and details may be made therein without departing from the spirit and scope of the invention.

What is claimed is:

1. A circuit arrangement for distinguishing between input signals representing binary ones and zeros including:

a difference amplifier having a first output line and a second output line, a detector coupled to the first output line, means coupled between the second output line and the detector for disabling the detector whenever a signal of a predetermined polarity appears on the second output line, the difference amplifier having two input lines and means connecting input signals representing binary ones and zeros across the two input lines of the difference amplifier, whereby the detector provides one output signal to represent a binary zero and a different output signal to represent a binary one.

2. The aparatus of claim 1 wheerin the means coupled between the second output line and the detector includes an avalanche transistor.

3. The apparatus of claim 2 wherein the detector includes a tunnel diode.

4. A circuit for distinguishing between signals representing binary ones and zeros including:

a detector, first means connected to said detector which is responsive to the binary input signals for amplifying and supplying them to the detector, a switch device, second means connected to said swi'ch device which is responsive to the binary input signals for amplifying, inverting and supplying them to the switch device.

means connecting the switch device to the detector, strobe signal means connected to the detector, the switch device being operated by signals of a given polarity to disable the detector whereby binary information is represented by different signals from the detector.

5. A circuit for reliably reading signals representing binary ones and zeros from a high speed memory device wherein a binary one is represented by a signal having a positive swing followed by a negative swing and a binary zero is represented by a signal having a negative swing followed by a positive swing comprising:

a difference amplifier having first and second outputs, a detector having first and second inputs and an output, means connecting the first output from the difference amplifier to the first input of the detector, a voltage switch having an input and an output, means connecting the second output from the difference amplifier to the input of the voltage switch, means connecting the output of the voltage switch to the second input of the detector, a bias source connected to the second input of the detector, whereby binary one signals represented by a positive swing followed by a negative swing applied to the difference amplifier produce a positive output signal pulse from the detector and binary zero signals represented by a negative swing followed by a positive swing applied to the difference amplifier produce no signal output from the detector.

6. The apparatus of claim 5 wherein the voltage switch includes an avalanche transistor having a base which serves as the input and a collector which serves as the output, said avalanche transistor further having an emitter connected to a bias source.

7. The apparatus of claim 5 wherein the detector includes a tunnel diode which is biased in a forward direction below its switching point, and the tunnel diode responds to the positive swing of a binary one signal to operate the detector and provide an output signal representing a binary one.

References Cited

UNITED STATES PATENTS

| | | | |
|---|---|---|---|
| 3,096,449 | 7/1963 | Stucki | 307—258 |
| 3,233,119 | 2/1966 | Kruj | 307—236 |
| 3,234,400 | 2/1966 | Hart | 307—262 XR |
| 3,287,647 | 11/1966 | Engel | 328—165 XR |
| 3,302,036 | 1/1967 | Cosentino et al. | 307—286 XR |
| 3,308,308 | 2/1967 | Bray | 307—267 |

OTHER REFERENCES

IBM Technical Disclosure, vol. 7, No. 9, February 1965, pp. 844, 845, an article titled Bipolar Detector Using Minority Storage written by R. A. Schumacher.

ARTHUR GAUSS, Primary Examiner

STANLEY T. KRAWCZEWICZ, Assistant Examiner

U.S. Cl. X.R.

307—127, 236, 258, 286, 328—118, 140, 165